(12) United States Patent
Ono et al.

(10) Patent No.: US 6,633,308 B1
(45) Date of Patent: *Oct. 14, 2003

(54) IMAGE PROCESSING APPARATUS FOR EDITING A DYNAMIC IMAGE HAVING A FIRST AND A SECOND HIERARCHY CLASSIFYING AND SYNTHESIZING PLURAL SETS OF: FRAME IMAGES DISPLAYED IN A TREE STRUCTURE

(75) Inventors: Eita Ono, Tokyo (JP); Hiroshi Okazaki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/432,717

(22) Filed: May 2, 1995

(30) Foreign Application Priority Data

May 9, 1994 (JP) .............................................. 6-094606

(51) Int. Cl.[7] ................................................ G06F 3/00
(52) U.S. Cl. ...................................... 345/723; 345/853
(58) Field of Search ................................. 345/348, 960, 345/951, 723–725, 719, 853, 764, 769, 770, 835, 328, 327, 356, 339, 302, 972; 707/101, 102, 104, 501, 513, 104.1, 500.1, 501.1; 715/500.1, 501.1, 513; 395/133, 154, 153, 160, 155, 161, 328, 327, 356, 339, 806, 807, 972

(56) References Cited

U.S. PATENT DOCUMENTS

| | | | | | |
|---|---|---|---|---|---|
| 5,177,513 | A | * | 1/1993 | Saito | 352/129 |
| 5,191,645 | A | * | 3/1993 | Carlucci et al. | 345/723 |
| 5,204,706 | A | * | 4/1993 | Saito | 352/129 |
| 5,237,648 | A | * | 8/1993 | Mills et al. | 345/723 |
| 5,404,316 | A | * | 4/1995 | Klingler et al. | 345/723 |
| 5,442,744 | A | * | 8/1995 | Piech et al. | 715/500.1 |
| 5,513,306 | A | * | 4/1996 | Mills et al. | 715/530 |
| 5,532,833 | A | * | 7/1996 | Hong et al. | 386/77 |
| 5,537,528 | A | * | 7/1996 | Takahashi et al. | 715/512 |
| 5,737,552 | A | * | 4/1998 | Lavallee et al. | 345/720 |
| 5,956,453 | A | * | 9/1999 | Yaegashi et al. | 386/111 |

FOREIGN PATENT DOCUMENTS

| | | |
|---|---|---|
| EP | 0555028 | 8/1993 |
| JP | 4-207877 | * 7/1992 |
| JP | 5-227-477 | * 9/1993 |
| WO | WO93/07554 | 4/1993 |

OTHER PUBLICATIONS

English Language Translation of JP–4–207877.*
Derwent Machine–Assisted Translation of JP–5–227–477.*

* cited by examiner

*Primary Examiner*—Crescelle N. dela Torre
(74) *Attorney, Agent, or Firm*—Fitzpatrick, Cella, Harper & Scinto

(57) ABSTRACT

Scenes having arbitrary sizes can be collectively edited. Dynamic image data is managed by a tree structure in accordance with scenes. An array of scenes belonging to a higher order hierarchy than a reference hierarchy by one level is displayed in a scene display area, an array of scenes belonging to the reference hierarchy is displayed in a scene display area, and an array of scenes belonging to a given scene and having an order hierarchy lower by one level than the given scene which is designated by an operator and selected from scenes displayed in the reference hierarchy is displayed in a scene display area. An arbitrary scene displayed in the scene display area is designated, and processing (copy, move, divide, and synthesize) for the designated scene is designated. A tree structure portion of the designated scene is modified in accordance with the designated processing.

6 Claims, 15 Drawing Sheets

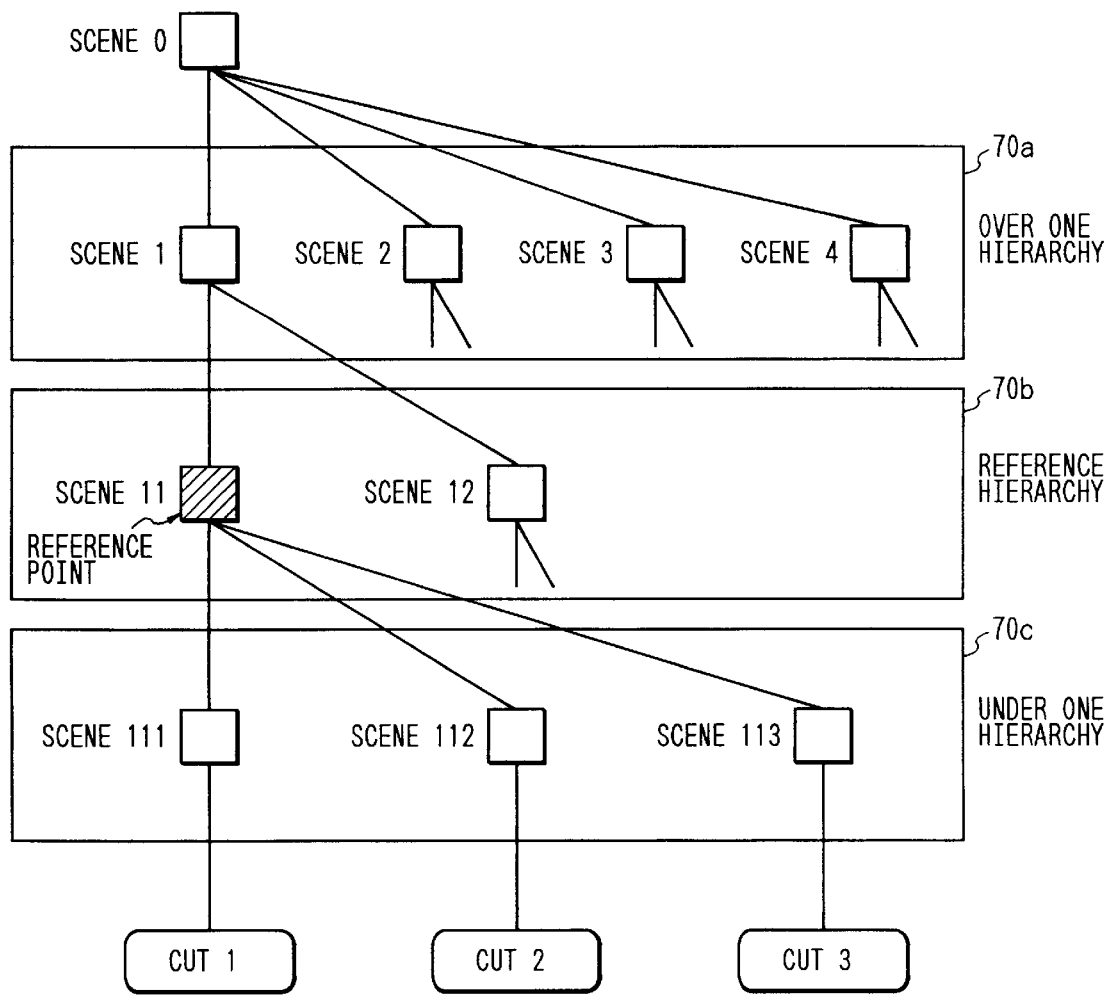

IMAGE PROCESSING APPARATUS FOR EDITING A DYNAMIC IMAGE HAVING A FIRST AND A SECOND HIERARCHY CLASSIFYING AND SYNTHESIZING PLURAL SETS OF: FRAME IMAGES DISPLAYED IN A TREE STRUCTURE

BACKGROUND OF THE INVENTION

1. Field of the Invention

The present invention relates to an image processing apparatus and, more particularly, to an image processing apparatus and method suitable for editing a dynamic image.

2. Related Background Arts

In a known conventional arrangement, cuts constituting a dynamic image such as a video image are automatically or manually extracted from the dynamic image and rearranged along the time base in accordance with the reproduction order to edit the dynamic image.

The cuts indicate dynamic image data groups serving as minimum constituent units of the dynamic image and constituted by image data divided by scene changes. A scene indicates an image data group consisting of one or two or more cuts given a certain meaning. For this reason, the term "scene" may indicate one or more scenes.

Each extracted cut is represented by an icon (to be referred to as a cut icon hereinafter) consisting of a reduced representative image (normally a start frame) of the cut. The cut icon is displayed on a screen. A technique for manipulating this cut icon on the screen to edit a desired dynamic image is also available. For example, the order of cut icons is changed to change the reproduction order. According to this technique, dynamic image editing can be interrogatively performed while an edited dynamic image is obtained in real time.

According to this method, cut icons whose number is equal to the number of cuts are used, and dynamic image editing is a simple repetition of monotonous operations for rearranging these cut icons. Therefore, when the number of cut icons increases, the number of operations for the cut icons increases like a geometric series, thereby extremely complicating the manipulations.

In other words, a plurality of cuts cannot be edited at once. As described above, the number of repetitive, monotonous operations undesirably increases with an increase in the number of cuts. In addition to editing in units of cuts, an editor may want to edit using a scenario, i.e., a plurality of cuts as a unit which is different from that of each cut. In addition to dynamic image editing in units of cuts, demand has arisen for providing an editing technique capable of arbitrarily setting and selecting the unit of editing in accordance with the will of the editor.

SUMMARY OF THE INVENTION

It is the primary object of the present invention to provide an image processing apparatus having an edit function for responding to the above demand.

It is another object of the present invention to provide an image processing apparatus and method capable of editing a dynamic image in an arbitrary unit of editing.

In order to achieve the above objects of the present invention, there is provided an image processing apparatus for editing image data constituted by an image data group of a plurality of frames. The image apparatus comprises memory means for classifying the image data group into a plurality of sets in accordance with characteristics of the image data and storing a relationship between the classified sets, display means for performing a hierarchical display of the sets of the image data in accordance with the relationship stored in the memory means, and designating means for designating editing of the image data group in units of the sets.

It is still another object of the present invention to provide an image processing apparatus and method capable of allowing a user to easily perform dynamic image editing.

It is still another object of the present invention to provide an image processing apparatus and method capable of performing edit processing for each hierarchical level after a dynamic image is hierarchically defined.

It is still another object of the present invention to provide an image processing apparatus and method having a novel function.

The above and other objects, features, and advantages of the present invention will be apparent from the following detailed description in conjunction with the accompanying drawings.

BRIEF DESCRIPTION OF THE DRAWINGS

FIG. 7 is a view for explaining the relationship between the edit screen shown in FIG. 5 and a tree structure;

DETAILED DESCRIPTION OF THE PREFERRED EMBODIMENT

A preferred embodiment of the present invention will be described in detail with reference to the accompanying drawings.

Figure 1:
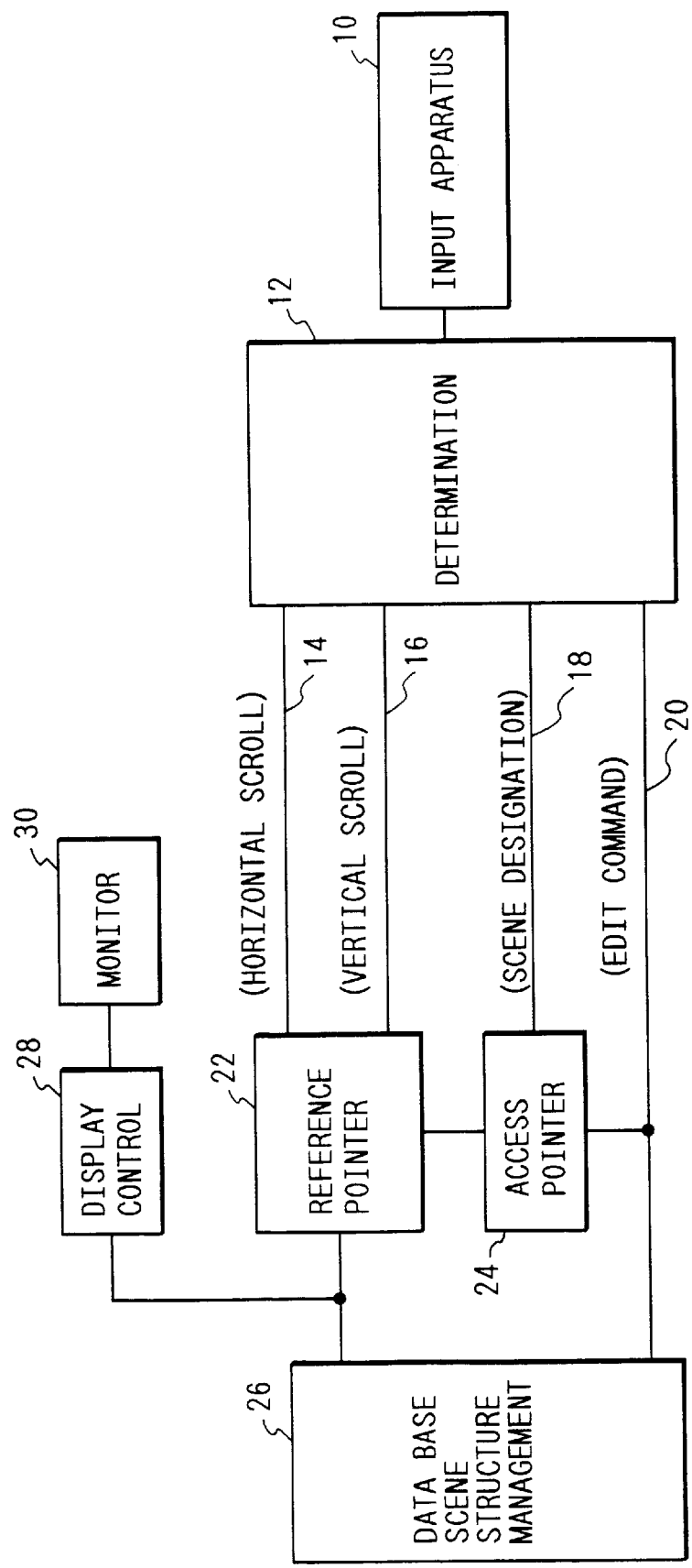
FIG. 1 is a block diagram for explaining the principle of the function of an embodiment of the present invention.

FIG. 1 is a block diagram showing the schematic arrangement of a preferred embodiment of the present invention. Referring to FIG. 1, an input apparatus 10 comprised of a mouse and a keyboard is manipulated by a user or operator. A determination unit 12 determines whether an input from the input apparatus 10 represents a horizontal scroll 14, a vertical scroll 15, a scene designation 18, or an edit command 20.

When the input represents the horizontal scroll 14 and the vertical scroll 15, a scene as the center of the display is registered in a reference pointer 22. When the input represents the scene designation 18, a scene as an edit manipulation target is registered in an access pointer 24. When the input represents the edit command 20, a scene having a lower order hierarchy than the scene registered in the access pointer 24 is edited. The detailed contents of editing are described in detail in a subsequent explanation of the edit command. Various processing operations for modifying a tree structure are performed on the basis of designated edit commands, and processing results are registered in a scene structure management unit 26, so that arbitrary editing can be performed for a scene structure, thereby allowing editing of dynamic image data. A display control unit 28 refers to the scene structure management unit 26 and the reference pointer 22, and generates scene icons centered on a scene represented by the reference pointer 22 on the basis of the scene structure of the scene structure management unit 26. The display control unit 28 displays these scene icons on a monitor unit 30 in a manner to be described later in accordance with the scene structure.

Figure 2:
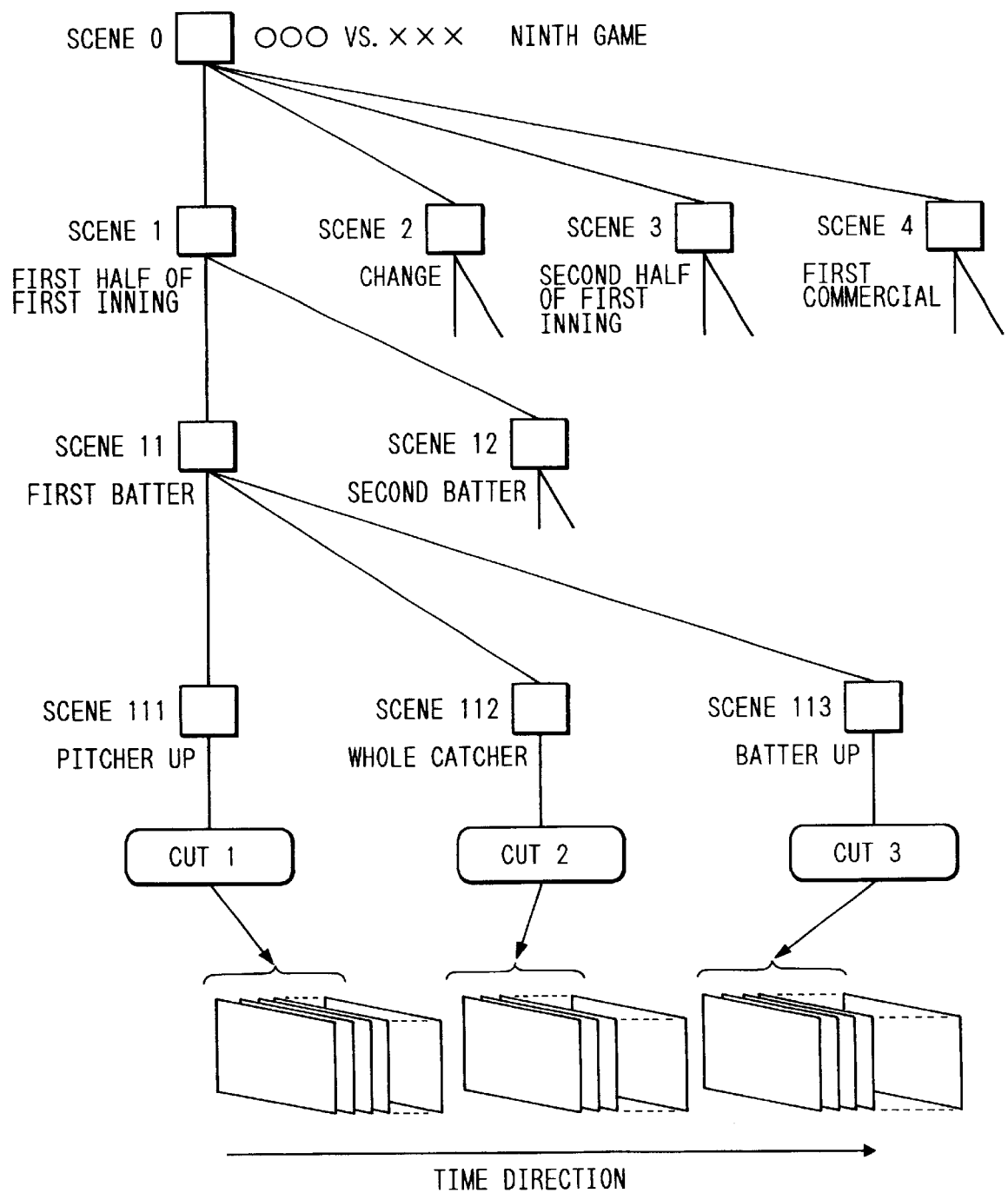
FIG. 2 is a view for explaining the hierarchical structure of a scene.

Hierarchically described dynamic image data in this embodiment will be described with reference to FIG. 2.

Dynamic data consists of a series of still images continuous in the time direction. A series of screen image data can be divided into cuts or scenes in accordance with the contents of the screen image data. As previously described, each cut constitutes an image data group as a minimum constituent unit of the dynamic image and is divided by scene changes. An image data group constituting a series of cuts having a certain meaning is called a scene. Each scene represents all or part of the dynamic image depending on its meaning. That is, an image group in a baseball game is taken as an example of edit images in FIG. 2. When a scene is defined by a set of "ooo vs. xxx, Ninth Game", the scene becomes all the dynamic image (i.e., the entire image data group). When a scene is defined as a set of "Pitcher Up, First Inning, Ninth Game", the scene is represented by several cuts (or one cut). For this reason, one image data group can be managed by the data structure of a hierarchical tree structure using scenes and cuts, as shown in FIG. 2. A scene having the lowest order hierarchy is a cut, and the respective cuts correspond to the respective parts of the image data group. A scene having a high order hierarchy consists of a combination of scenes having lower order hierarchies. A scene having the highest order hierarchy represents the entire dynamic image constituted by all the cuts.

The image data group has an order in the time direction. In a tree structure, a left cut or scene is earlier than a right cut or scene in the time direction. When the position of a scene in the tree structure is changed, the order of cuts having lower order hierarchies than that of this scene is changed, and the reproduction order of cuts constituting the dynamic image is changed. That is, a dynamic image constituted by the image data group can be edited.

Figure 3:
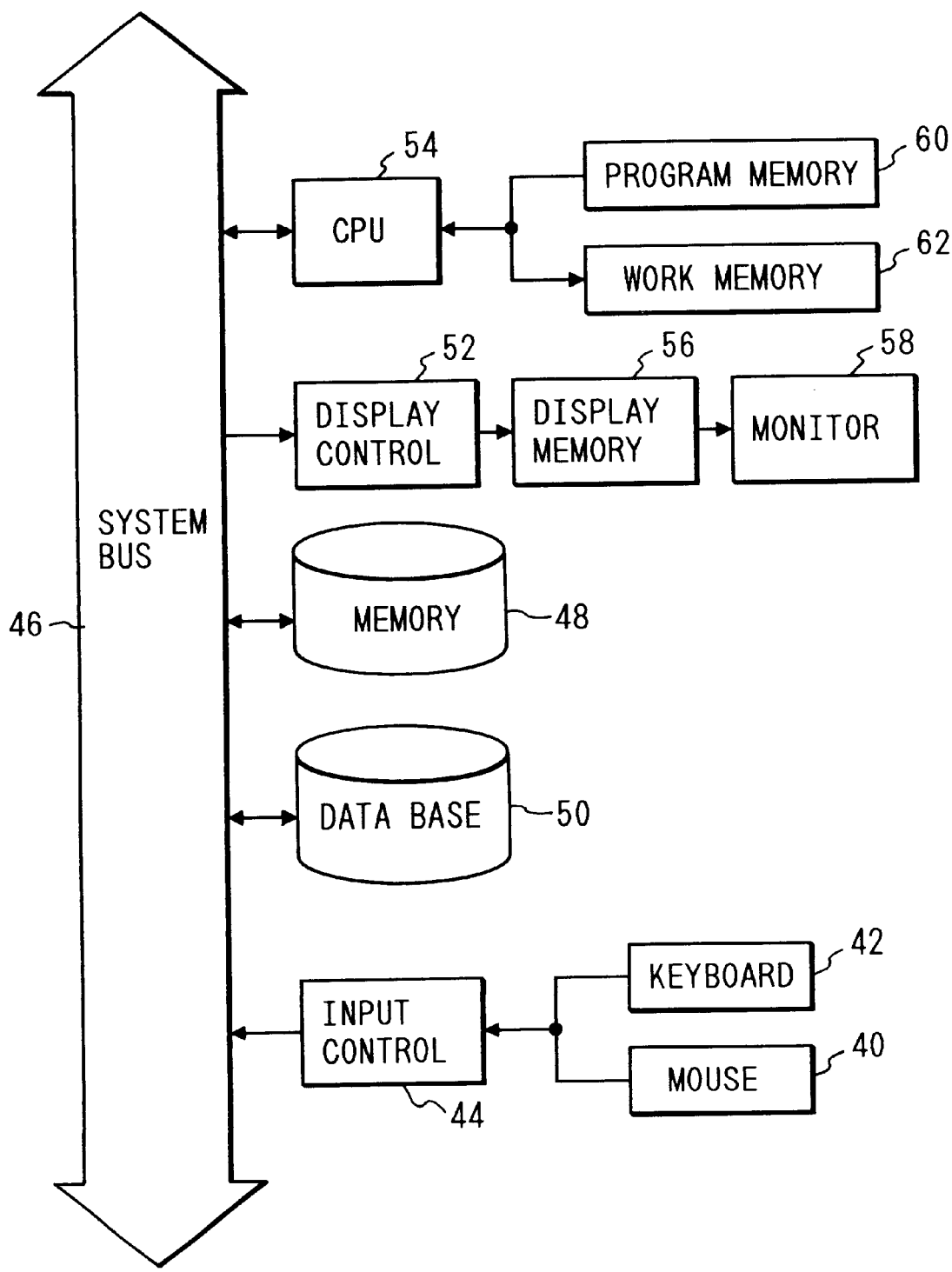
FIG. 3 is a block diagram showing a hardware arrangement for realizing this embodiment.

FIG. 3 is a block diagram showing a hardware arrangement according to this embodiment. A mouse 40 serves as a coordinate input apparatus for inputting coordinates on a monitor. A keyboard 42 is connected to a system bus 46 through an input control circuit 44. A large-capacity memory 48 for storing dynamic image data, a data base 50 for managing the dynamic image data in a hierarchical structure, a display control unit 52 for controlling a display on the monitor screen, and a CPU 54 for controlling the overall apparatus and processing programs (to be described later) are also connected to the system bus 46. The display control circuit 52 displays a desired image on the screen of a monitor unit 58 through a display memory 56.

A program memory 60 and a work memory 62 are connected to the CPU 54. The program memory 60 stores a dynamic image edit program having a coordinate input processing routine and a dynamic image edit command processing routine. The work memory 62 is used to temporarily store, variables such as a present cursor coordinate position and reference data.

Figure 4:
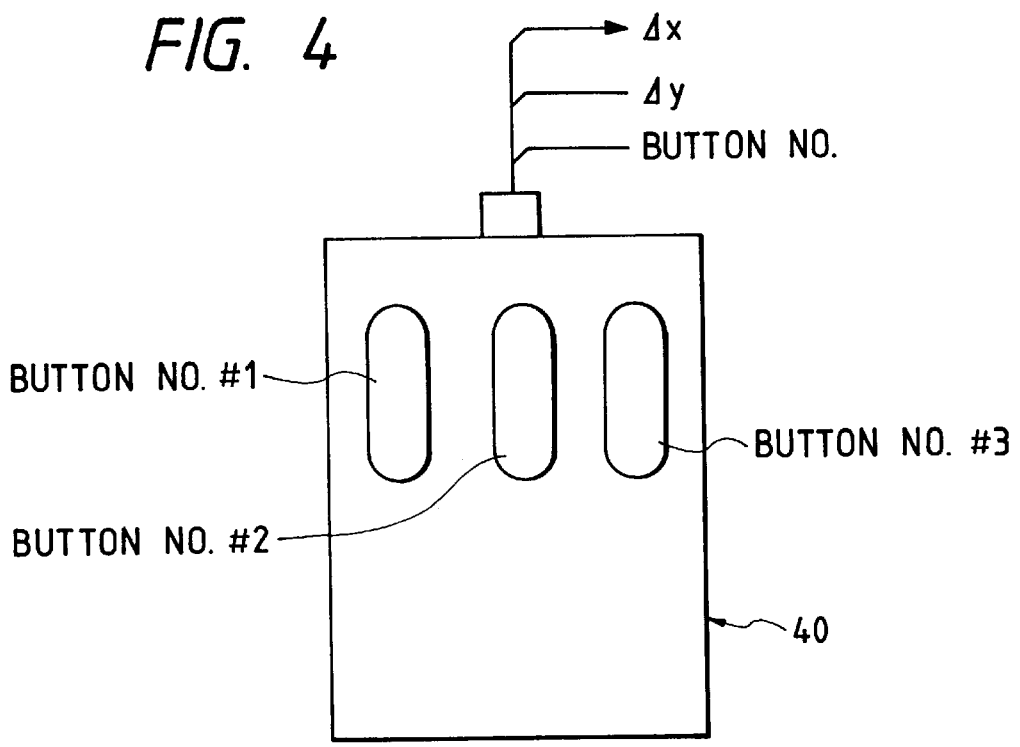
FIG. 4 is a plan view of a mouse 40.

As shown in FIG. 4, the mouse 40 has three buttons and outputs data representing moving amounts $\Delta x$ and $\Delta y$ and a signal representing a button manipulated state. When a button of the mouse 40 is depressed, the mouse 40 outputs a depressed button number, #1, #2, or #3. When no button is depressed, the mouse 40 outputs #0. The moving amounts $\Delta x$ and $\Delta y$ of the mouse 40 and the button number of a depressed button are periodically input from the mouse 40 to the input control circuit 44. The input control circuit 44 transfers the input moving amounts $\Delta x$ and $\Delta y$ and the input button number data to the CPU 54 through the system bus 46. When the input button number is #0, the CPU 54 changes the cursor coordinates corresponding to the input moving amounts $\Delta x$ and $\Delta y$. The CPU 54 stores the changed cursor coordinate data in the work memory 62 and outputs them to the display control circuit 52.

The display control circuit 52 writes a cursor image at an address of the display memory 56 which reflects the input cursor coordinate values. Therefore, the monitor unit 58 displays a cursor at a screen position corresponding to the movement of the mouse 40.

The data base 50 manages the tree structure data and corresponds to the scene structure management unit 26 in FIG. 1. A unit constituting the tree structure, i.e., a node corresponds to one scene of a dynamic image, and the corresponding dynamic image scene is designated by a specially assigned number (ID number). In this data base, a plurality of tree structures can be managed. The dynamic image data is stored in the memory 48. Note that the data base 50 stores address information corresponding to the ID number of each scene constituting the dynamic image stored in the memory 48 and position information in the tree structure of each scene.

Figure 5:
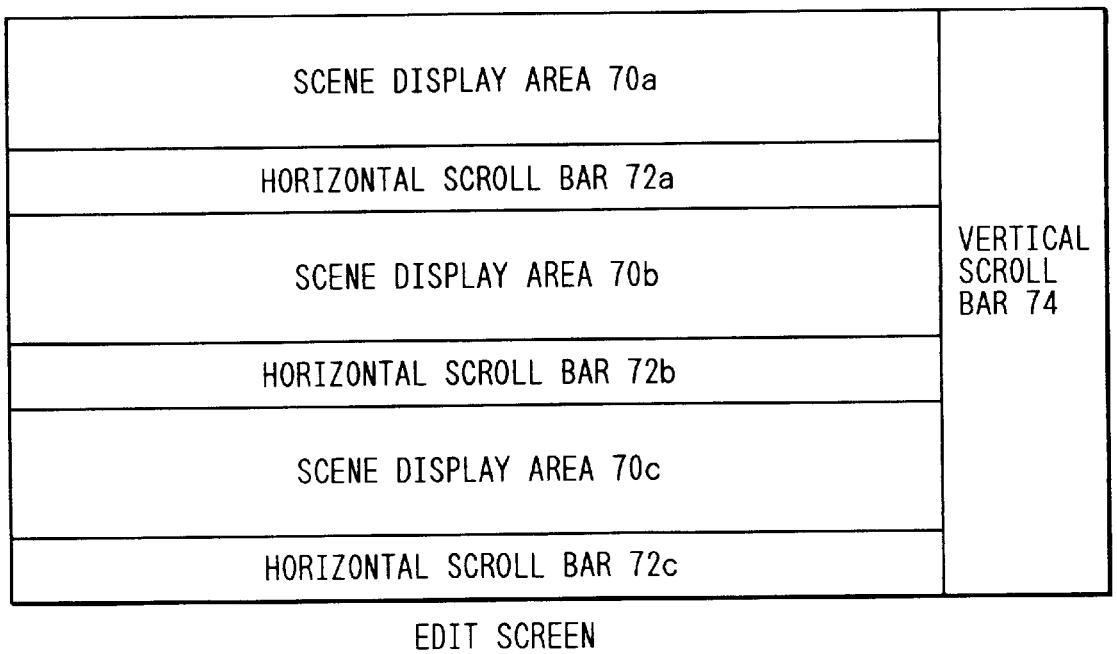
FIG. 5 is a view for explaining an edit screen of this embodiment.

FIG. 5 shows an edit screen of this embodiment. Under the control of the CPU, scene designation information and a scene adjacent to the designated scene in the tree structure are read out from the data base 50, and the memory 48 is accessed to allow a display of a desired scene on an edit screen. This edit screen is comprised of three horizontally elongated scene display areas 70*a*, 70*b*, and 70*c* for displaying scenes as icons, horizontal scroll bars 72*a*, 72*b*, and 72*c* respectively located below the scene display areas 70*a*, 70*b*, and 70*c* and used to manipulate the display positions within the areas of the corresponding scene display areas 70*a*, 70*b*, and 70*c*, and a vertical scroll bar 74, located at the right of the edit screen; and used to change the hierarchy of data displayed in an active one of the three scene display areas 70*a*, 70*b*, and 70*c*. That is, the vertical scroll bar 74 is used to change the hierarchy in designating a scene to be edited.

Figure 6:
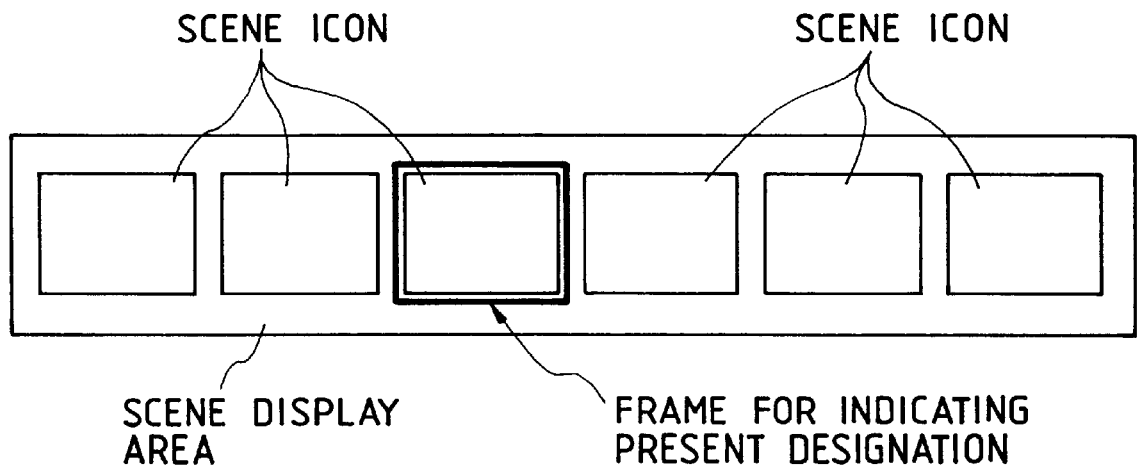
FIG. 6 is a view for explaining a scene display screen.

In each of the scene display areas 70*a*, 70*b*, and 70*c*, scenes of a designated hierarchy are displayed in an array of icons (reduced images) representing the respective scenes centered on the node represented by the reference pointer 22, as shown in FIG. 6. An icon is displayed for each scene. When a predetermined still image as a representative image of the scene which represents the contents of the scene is designated, the designated image is reduced into a predetermined size, and the reduced image is used as a scene icon. However, when no still image is designated, the first image is reduced into the predetermined size, and the reduced image is used as a scene icon. The presently referred scene icon may be surrounded by a thick frame or flickered to inform the editor of present designation, which technique is known well to those skilled in the art.

As shown in FIG. 7, the three scene display areas 70a, 70b, and 70c display a scene structure having three different hierarchies. The scene display area 70a displays a scene having a higher order hierarchy than that of the reference pointer 22 by one level. The scene display area 70b displays a scene having the same hierarchical level as that of the reference pointer 22. The scene display area 70c displays a scene having a lower order hierarchy than that of the reference pointer 22 by one level and belonging to the node of the reference pointer 22.

Figure 8:
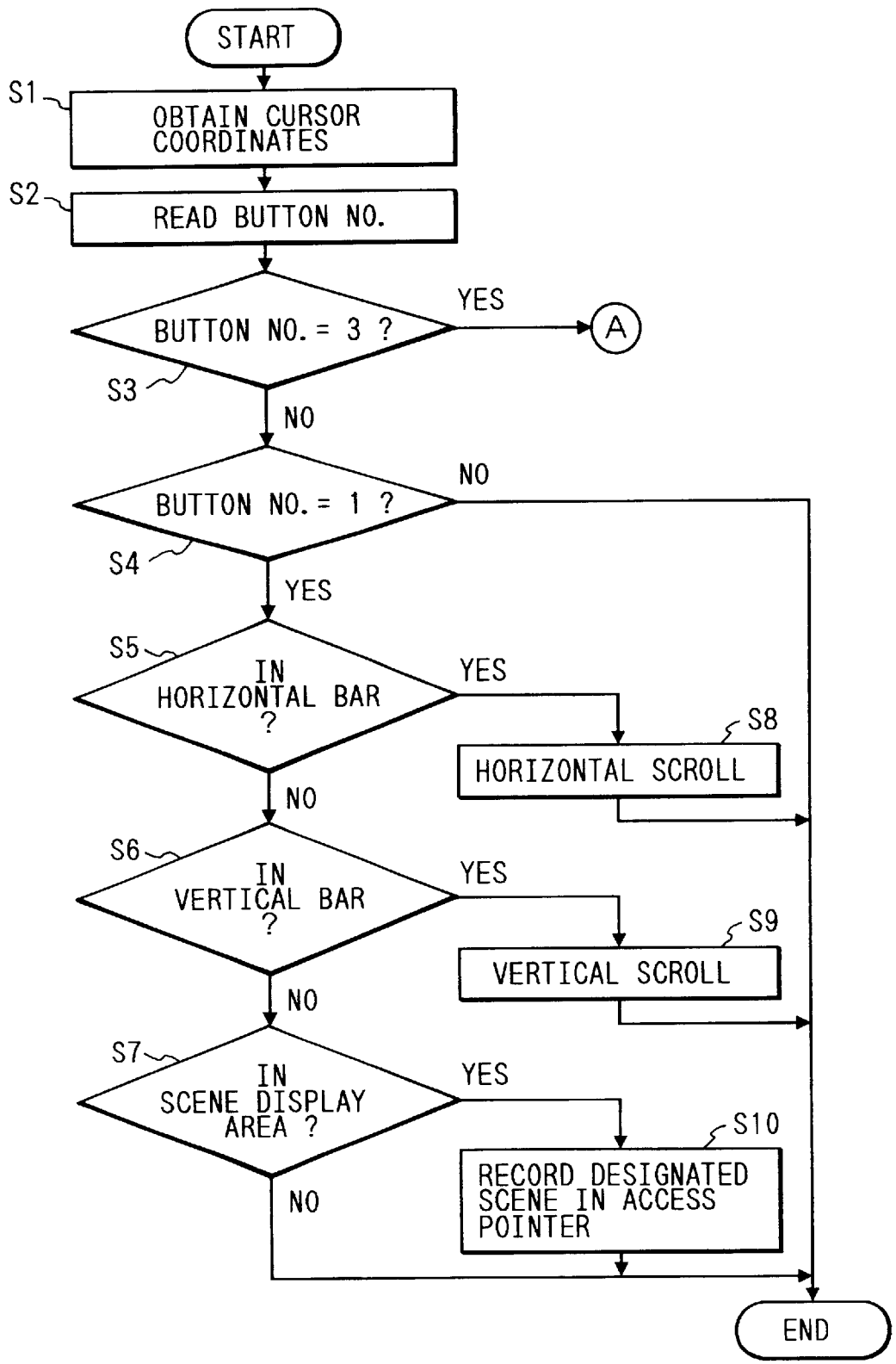
FIG. 8 is a flow chart showing part of the operation upon manipulations of the mouse 40.
Figure 9:
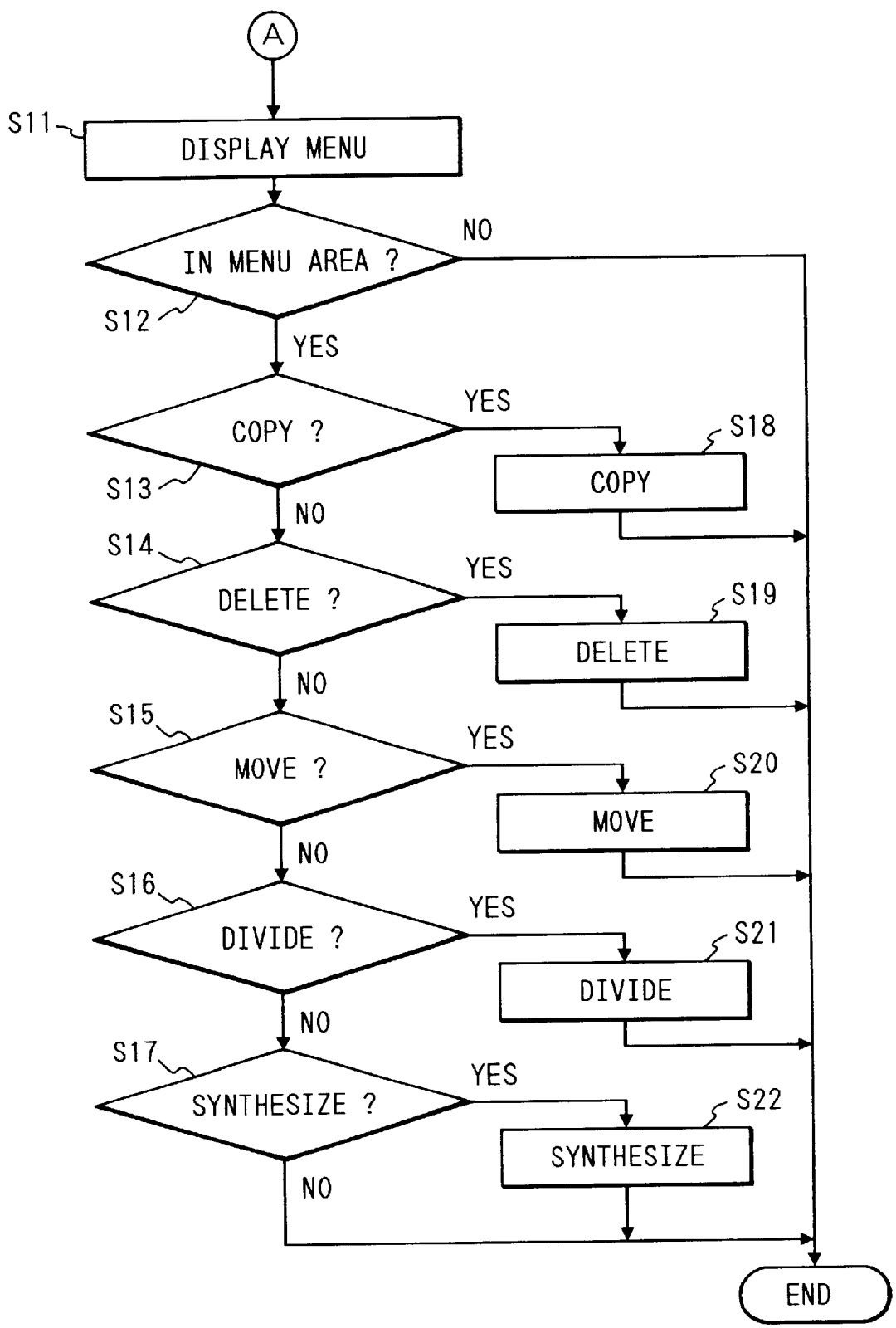
FIG. 9 is a flow chart showing the remaining part of the operation upon manipulations of the mouse 40.

An operation upon depression of a button of the mouse 40 will be described below. FIGS. 8 and 9 are flow charts showing the operation of the mouse 40. When the button number data from the mouse 40 represents a number except for #0, the CPU 54 starts the processes of the flow charts shown in FIGS. 8 and 9. First of all, the CPU 54 reads or obtains the present cursor coordinates from the work memory 62 (S1) and reads the button number of a button depressed on the mouse 40 (S2).

When the button number is "1" (S4), the CPU 54 determines whether the present cursor coordinates fall within the area of the horizontal scroll bar 72a, 72b, or 72c the vertical scroll bar 74, or the scene display area 70a, 70b, or 70c (S5, S6, and S7).

When the cursor coordinates fall within the area of the horizontal scroll bar 72a, 72b, or 72c (S5), the relative coordinate values within the corresponding horizontal scroll bar are calculated, and a corresponding node within the same hierarchical level is registered as a new reference pointer (S8). Therefore, in FIG. 2, when the reference pointer is, for example, scene 11, the horizontal scroll bar 72b is manipulated to allow changes in reference pointer within the same hierarchical level in an order of scene 11, scene 12, . . . .

If the present cursor coordinates fall within the area of the vertical scroll bar 74 (S6), the corresponding hierarchy is calculated from the coordinates in the vertical scroll bar 74. If the calculated hierarchy has a higher order than that of the present reference point, a node (constituent element of the tree structure) including the present reference point within this higher order hierarchy is recorded in the reference pointer 22 as a new reference point. That is, if the present reference pointer represents scene 11 in FIG. 7, the upper portion of the vertical scroll bar is designated to change the reference pointer to scene 1. However, if the calculated hierarchy has a lower order than that of the present reference point, the start node of all the nodes belonging to the presently referred point is recorded in the reference pointer 22 as a new pointer (S9). That is, if the present reference pointer represents scene 11 in FIG. 7, the lower portion of the vertical scroll bar is designated to change the reference pointer to scene 111. When the new pointer is recorded in the reference pointer 22, the display control unit 28 displays an array of scenes having the changed reference point as the center on the scene display area 70a, 70b, or 70c on the screen of the monitor unit 30. Therefore, when the reference pointer 22 represents a higher order hierarchy, the display control unit 28 displays the reference scene of the newly set higher order hierarchy in the scene display area 70b in FIG. 5.

When the present cursor coordinates fall within the area of the scene display area 70a, 70b, or 70c (S7), and is located on any one of the scene icons, the ID number of the designated scene icon is recorded in the access pointer 24 (S10).

Even if the button number is "1" (S4), if the present cursor coordinates fall within none of the areas of the horizontal scroll bars 72a, 72b, and 72c the vertical scroll bar 74, and the scene display areas 70a, 70b, and 70c, the operation is ended.

Figure 10:
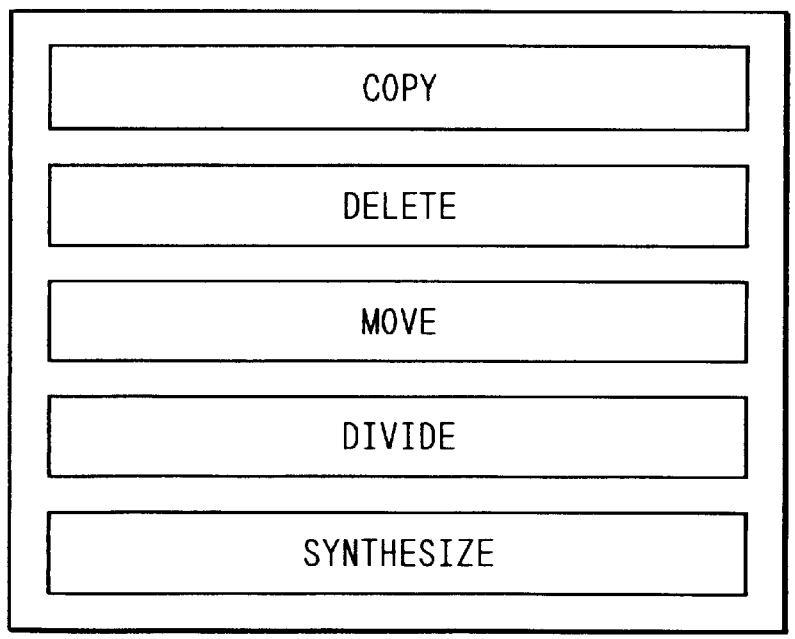
FIG. 10 is a view for explaining an edit command menu.

If the button number is "3" (S3), edit menu titles shown in FIG. 10 are displayed (S11). When any one of the items as the edit menu titles is selected (S12), an edit command corresponding to the selected item is executed (S13 to S22). When an area except for the menu title area is designated, the operation is ended.

In this embodiment, edit commands are scene "copy", "delete", "move", "divide", and "synthesize" commands, as shown in FIG. 10. Processing operations designated by these commands can be realized by actually manipulating tree structure data which hierarchically describes a dynamic image in question.

Editing will be described with reference to actual edit operations. To designate a scene to be edited, horizontal and vertical scroll operations are performed in the scene display area 70b to display an icon of the edit target scene. Subsequently, the cursor is moved onto the icon of the displayed scene, and button #1 of the mouse 40 is depressed to designate the edit target scene. After the edit target scene is selected, button #3 of the mouse 40 is depressed to display the menu titles shown in FIG. 10. The cursor is moved onto one of the menu items, and button #1 of the mouse 1 is depressed to designate an edit command for the edit target scene. If the designated command is a copy command, the storage destination of the copied node is designated with the mouse 40. However, if the designated command is a move command, the moving destination is designated with the mouse 40.

Each edit command executes processing for modifying or rearranging general tree structure data. For this reason, processing for modifying the tree structure corresponding to each edit command will be described below.

Figure 11:
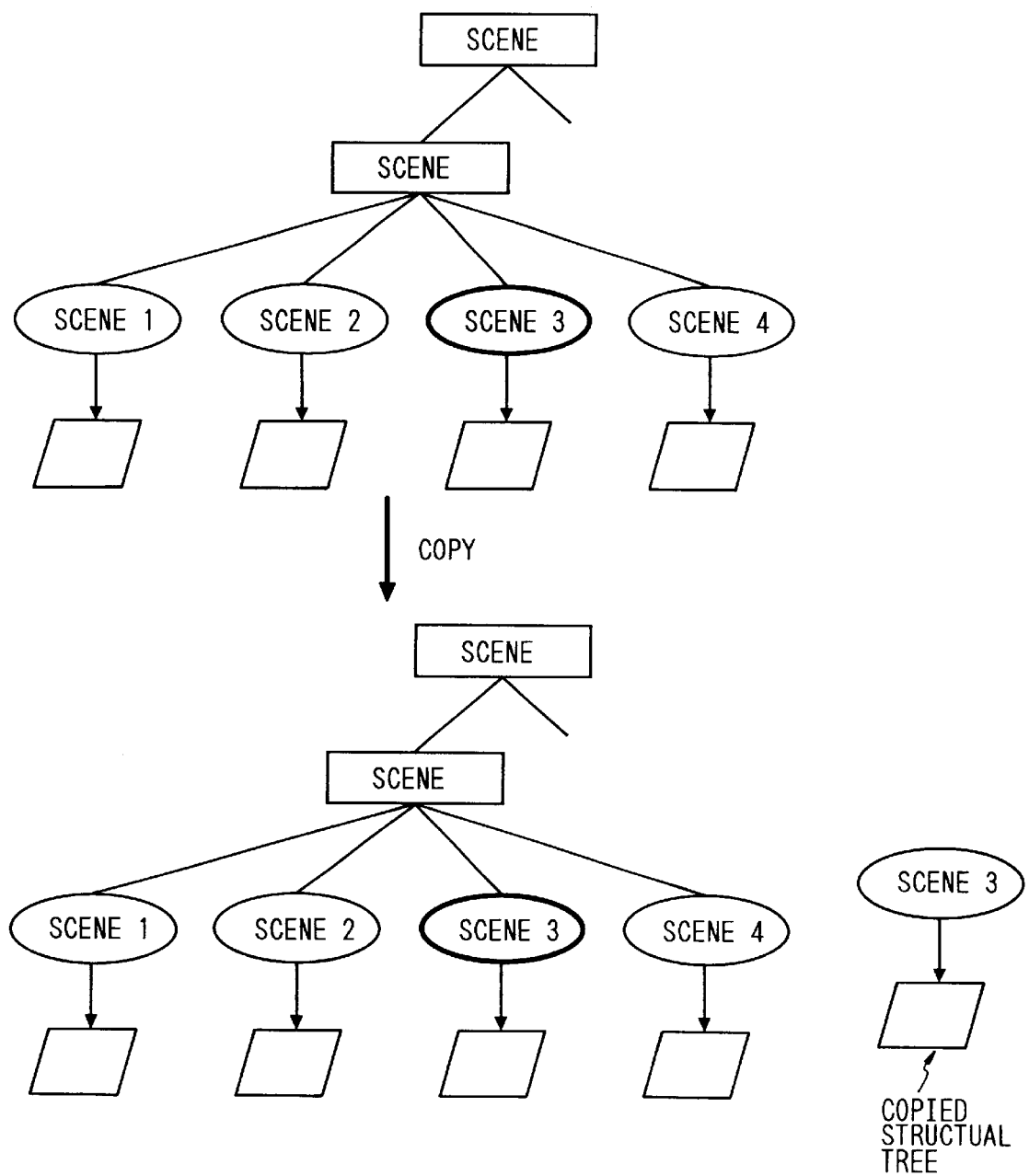
FIG. 11 is a view for explaining a modification of the tree structure for a copy command.

As shown in FIG. 11, the copy command creates a tree structure having, as a vertex, a scene designated by the scene designation 18, and locates the created tree structure data at an arbitrarily designated location. For example, to repeatedly display a given scene in a dynamic image, this scene is repeatedly created by copy commands, and the resultant identical scenes are continuously arranged.

Figure 12:
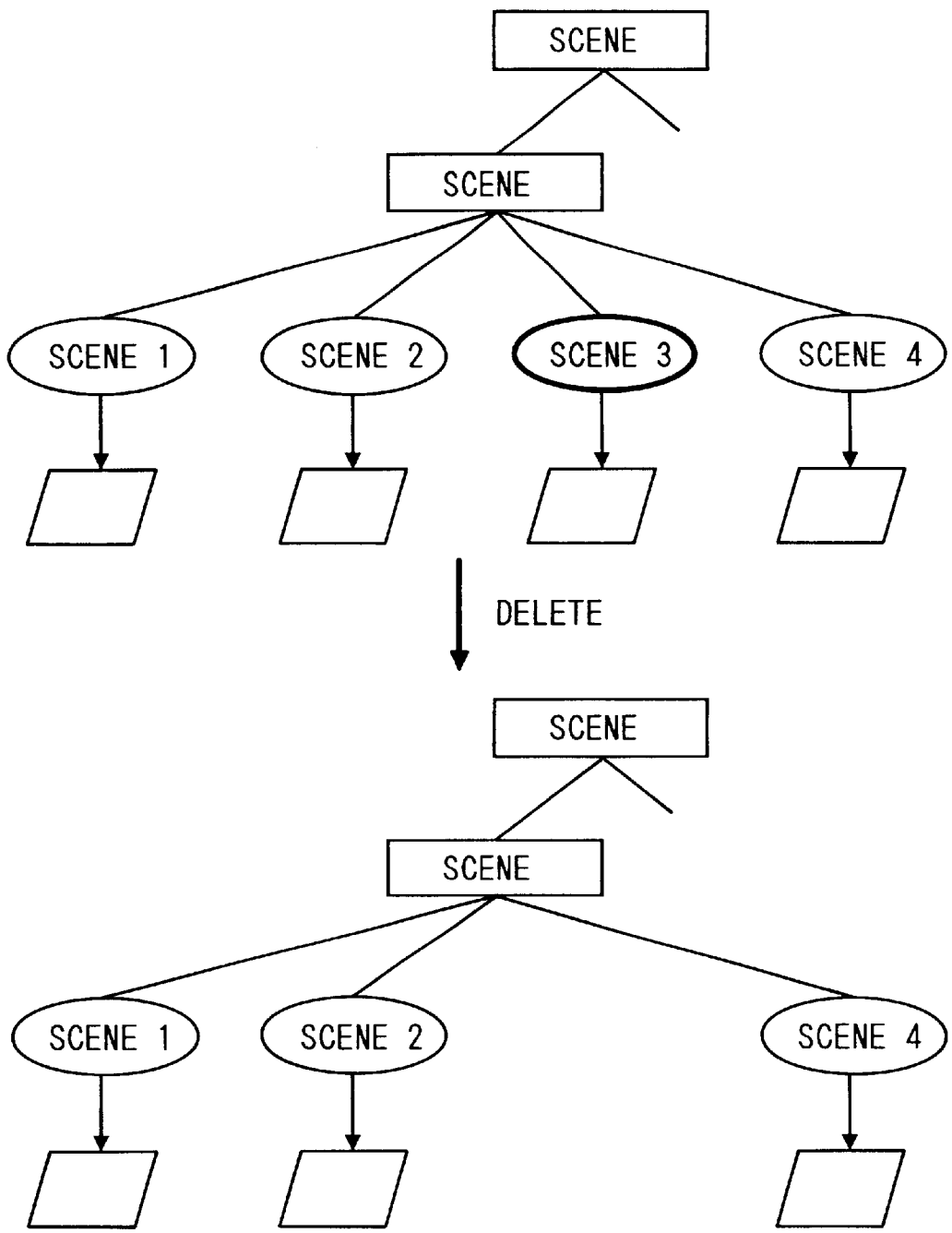
FIG. 12 is a view for explaining a modification of the tree structure for a delete command.

As shown in FIG. 12, the delete command deletes a tree structure having, as a vertex, a scene designated by the scene designation 18. This command is used to delete unnecessary scenes in a dynamic image.

Figure 13:
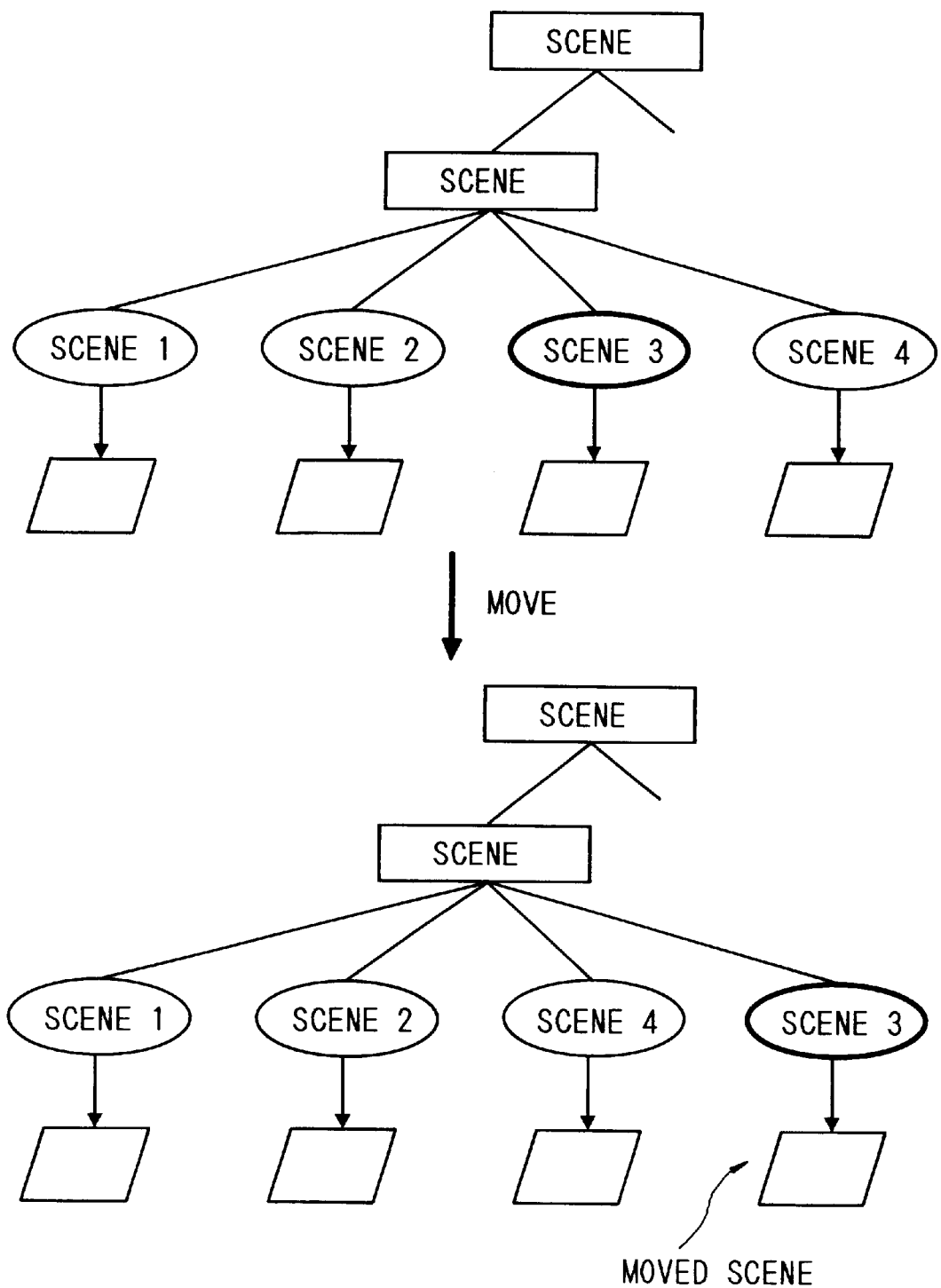
FIG. 13 is a view for explaining a modification of the tree structure for a move command.

As shown in FIG. 13, the move command moves a tree structure having, as a vertex, a scene designated by the scene designation 18 to an arbitrarily designated location. This command is used to change the order of scenes.

Figure 14:
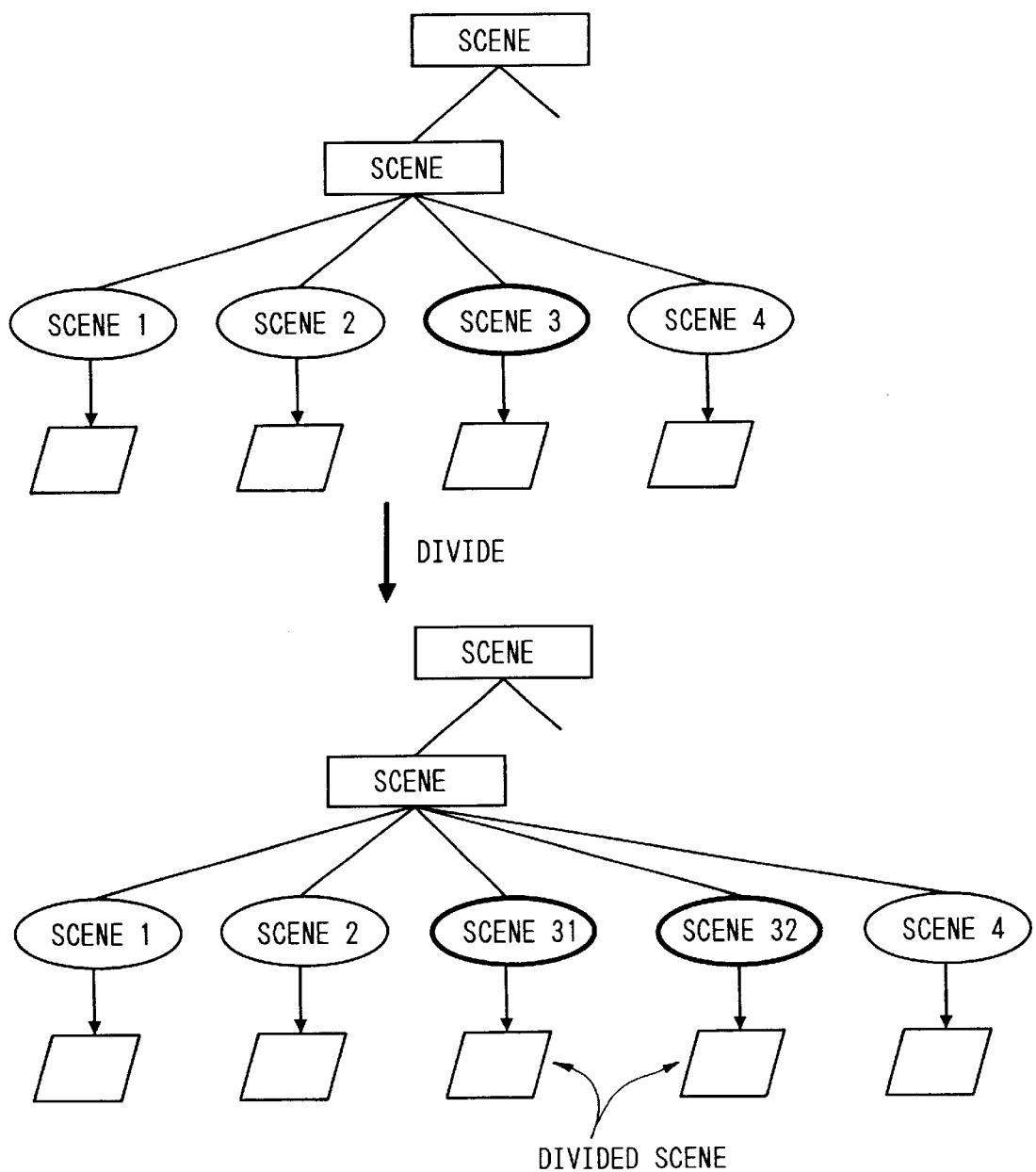
FIG. 14 is a view for explaining a modification of the tree structure for a divide command.

As shown in FIG. 14, the divide command divides scenes into two parts using a scene designated by the scene designation 18 as a boundary. This command is used when a scene having a high order hierarchy has an excessive number of scenes or cuts and must be divided into parts.

Figure 15:
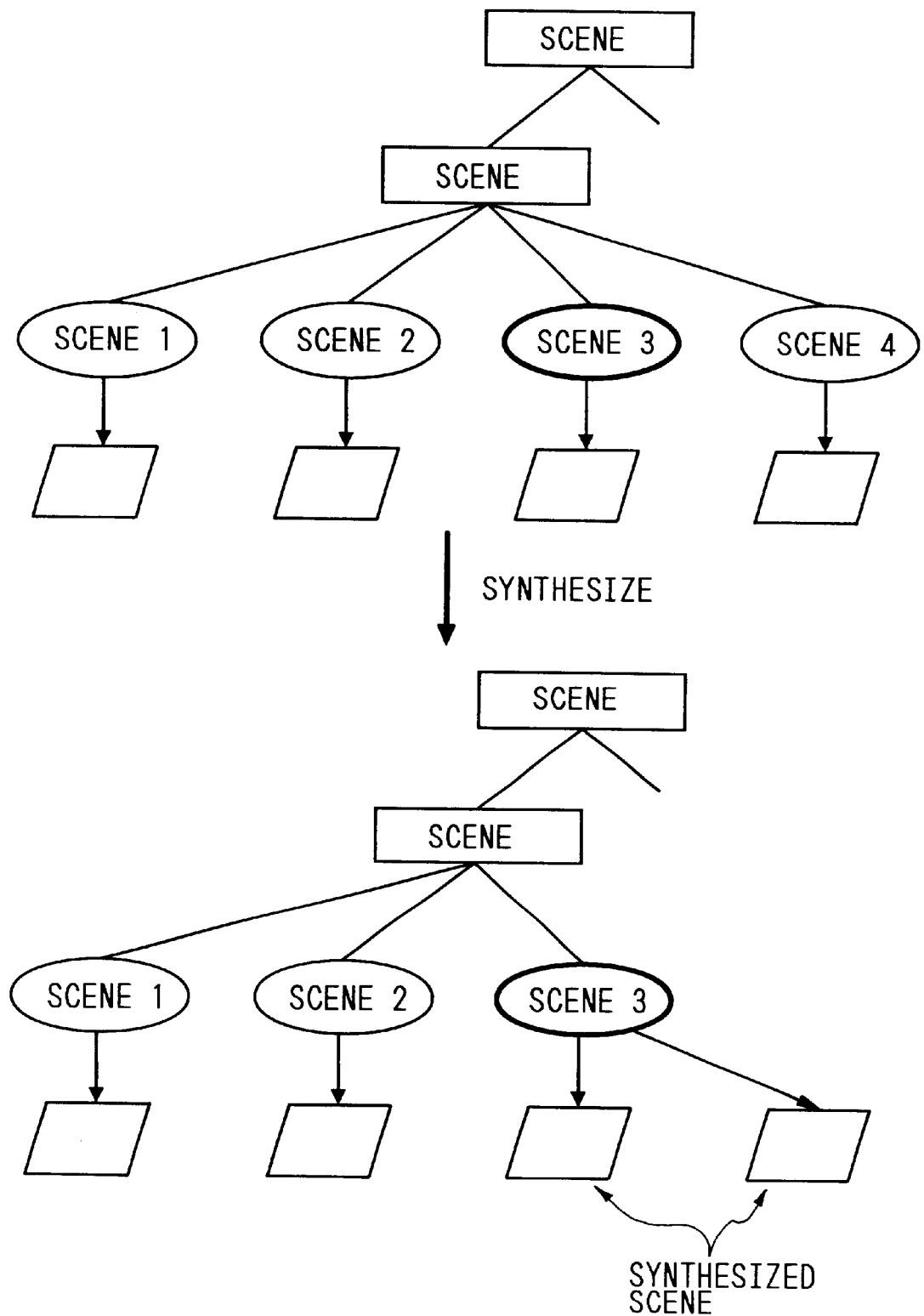
FIG. 15 is a view for explaining a modification of the tree structure for a synthesize command.

As shown in FIG. 15, the synthesize command synthesizes two or more scenes designated by the scene designation 18 into one scene. This command is used to synthesize two scenes into one scene to edit a larger number of cuts or scenes at once.

By the manipulations using the mouse on the screen, as described above, a tree structure which describes a dynamic image can be modified. The modified tree structure is stored in the data base 50. For this reason, the order of cuts having a lower order hierarchy in the modified tree structure is changed, and the dynamic image can be edited. In addition, a hierarchical structure is used to edit a dynamic image using a higher hierarchy, so that a plurality of cuts can be manipulated at once, thereby greatly reducing the manipulation load.

In the above embodiment, one dynamic image in which a scene arrangement is described by a tree structure is edited by modifying the corresponding tree structure. However, a method of sequentially extracting desired scenes from one or a plurality of dynamic images and creating a new tree structure may be employed.

Figure 16:
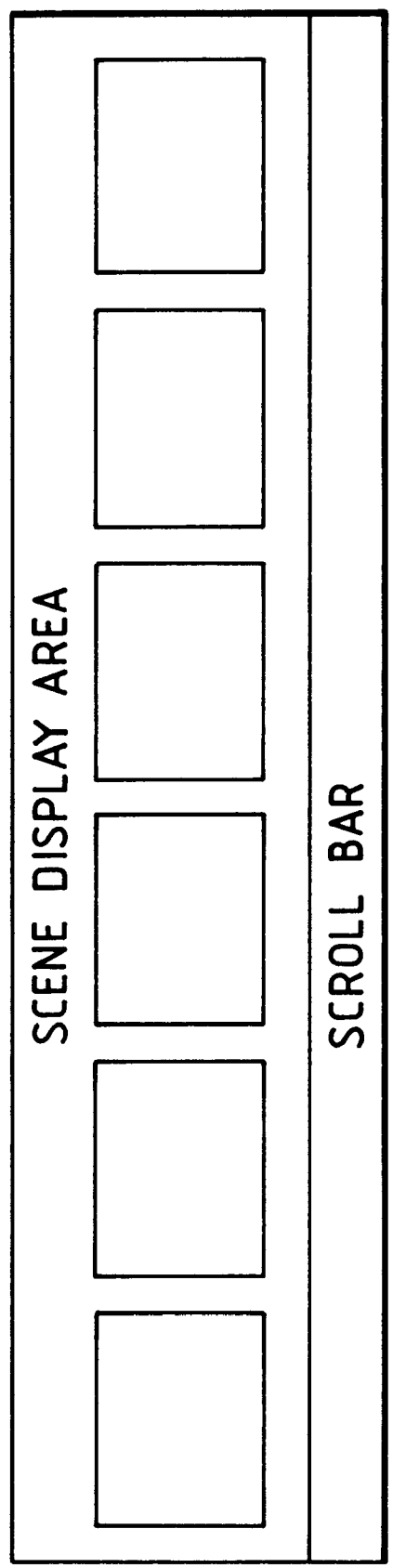
FIG. 16 is a view showing a new edit screen.

In this case, the edit screen is a scene designation screen for designating an arbitrary scene (node) in a dynamic image serving as an edit source. In addition, an edit scene display area (FIG. 16) for arranging scenes for constituting a newly created dynamic image (tree structure) is used.

A scene used for editing upon the scene designation operation described above is designated. The designated scene (node) is copied in the edit scene display area shown in FIG. 16. This operation is equivalent to an operation in which the designated node is copied in tree structure data (edit) different from the tree structure data to which the designated node belongs. All the scenes arranged in the edit scene display area belong to the edit tree structure data. By repeating this operation, new tree structure data is created. Since the edit command is a command for modifying a tree structure, this command is similarly effective for the newly created tree structure. This method is effective in creating a digest by acquiring the respective parts of long-span dynamic image data.

It is also possible not to extract partial trees constituting new target tree structure data from one tree structure data, but from a plurality of tree structure data (a plurality of dynamic images). In this case, a switch for switching between tree structures to be displayed on the edit screen shown in FIG. 5 is arranged, and part of an arbitrarily designated tree structure data is designated and copied in the edit scene display area.

When a change in display hierarchy is assigned to a specific button of the mouse 50 or a specific key of the keyboard 42, dynamic image editing can be performed without using scroll bars. This is a known technique in the field of computer software as a so-called short-cut.

Figure 17:
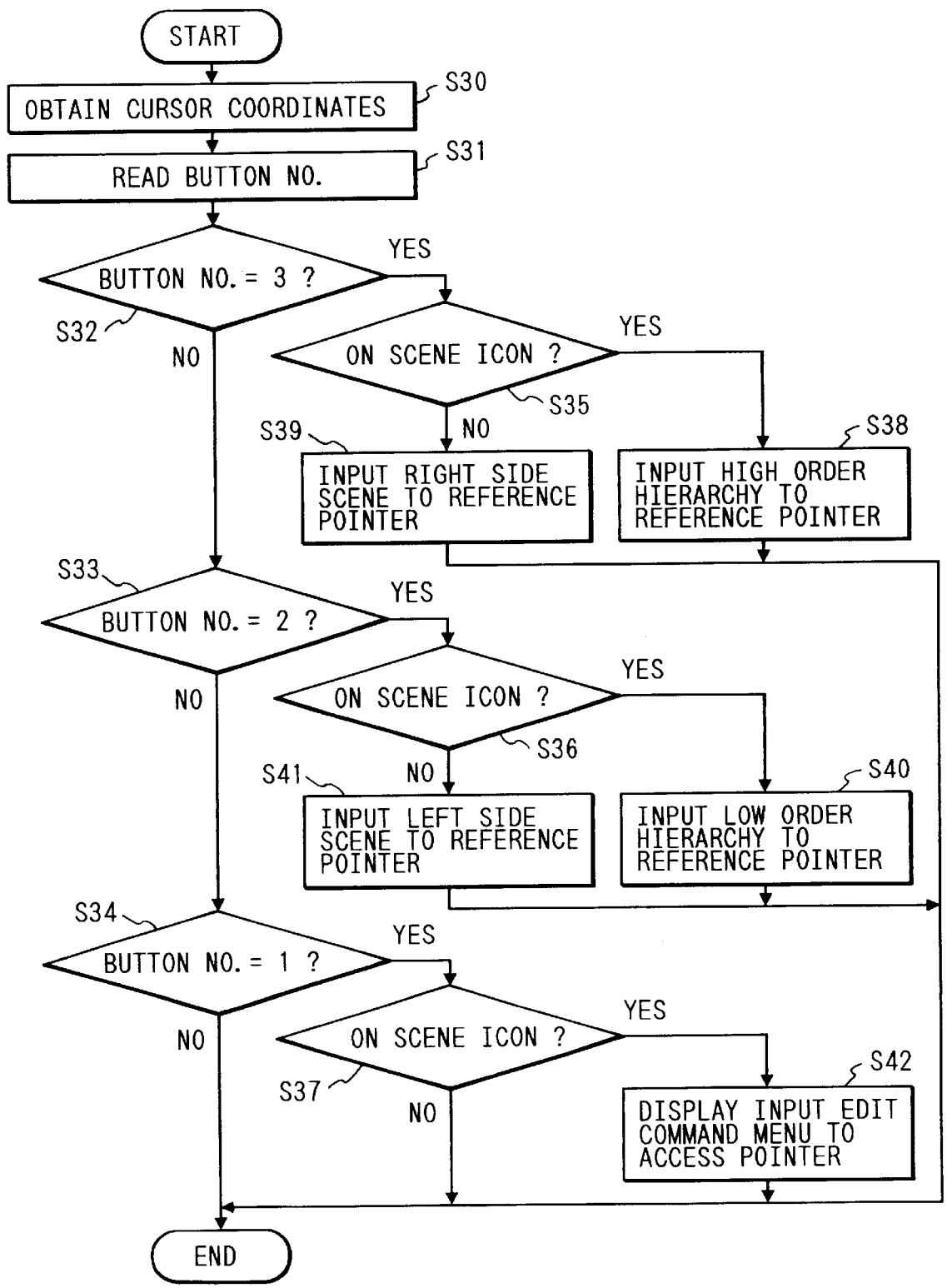
FIG. 17 is a flow chart showing a case in which specific functions are assigned to mouse buttons.

FIG. 17 is a flow chart for assigning specific functions to the three buttons of the mouse 40 depending on given situations. For example, when the cursor is located on a scene icon in a single scene display area, as shown in FIG. 6, and button #3 of the mouse 40 is depressed (S32 and S35), the reference pointer 22 is changed to a scene (node) having an order hierarchy higher by one level, and an array of scene icons each having an.order hierarchy higher by one level is displayed in the scene display area (S38). When button #2 is depressed (S33 and S36), the reference pointer 22 is changed to a scene (node) having an order hierarchy lower by one level, and an array of scene icons each having an order hierarchy lower by one level is displayed in the scene display area (S40).

When the cursor is located at a position except for the scene icons within the scene display area, and button #3 is depressed (S32 and S35), the reference pointer 22 is moved to a right scene (icon) by the number of scene icons displayed in the present scene display area, and an array of scene icons located to the right of the presently referred scene in the scene display area is displayed (S39). When button #2 is depressed (S33 and S36), an array of left scene icons is displayed (S41).

When the cursor is located on a scene icon, and button #1 is depressed (S34 and S37), data for displaying the input edit command menu is input to the access pointer 24, and a menu for selecting and editing scenes is displayed (S42). An edit command can be executed in the same manner as in the above embodiment.

The tree structure of this embodiment is not limited to the one displayed in FIG. 7, and a tree structure in another form may be used, as a matter of course. To manually input data to modify a tree structure, a touch panel on a screen or any other means may be used in addition to use of the mouse as in this embodiment as far as the data can be manually input.

In this embodiment, the scene structure is displayed on the display screen shown in FIG. 5 in the form of a tree structure. However, the scene structure is not limited to this. For example, tree structures shown in FIGS. 11 to 15 may be displayed without any modifications, and these tree structures may be modified on the display screen. With this arrangement, a tree structure can be simply displayed. Note that a method of displaying the edited dynamic image data is to access dynamic images in the memory 48 under the control of the CPU on the basis of the tree structure modified and stored in the data base and to sequentially display them on the monitor unit 48.

As can be readily understood from the above description, according to the embodiment of the present invention, a dynamic image in which a scene structure is hierarchically described can be edited by modifying the corresponding tree structure. Therefore, one or more cuts or scenes can be collectively and hierarchically processed, and the number of manipulations can be greatly reduced, thereby greatly improving operability.

What is claimed is:

1. An image editing apparatus comprising:

one or more original image display means for displaying one or more moving images used as an editing source by a hierarchical structure of a representative screen image of each of plural scenes;

duplicating means for duplicating one or more scenes from the one or more moving images as the editing source by selecting a representative screen image displayed by said one or more original image display means to generate a new moving image for editing;

display means to be used for editing, for displaying the new moving image for editing duplicated by said duplicating means by the representative screen image of the one or more scenes; and hierarchical managing means for managing the one or more moving images as the editing source and the new moving image for editing by the hierarchical structure, wherein the editing source includes a plurality of moving images, and wherein the duplicating by said duplicating means and the displaying by said display means are repeated using moving images extracted from the plurality of moving images to prepare a digest of the editing source.

2. An image editing apparatus according to claim 1, further comprising moving image editing means for editing the new moving image for editing by selecting a representative screen image of each scene displayed by said display means to be used for editing.

3. An image editing apparatus according to claim 1, wherein the representative screen image is a head image of each scene.

4. An image editing method comprising the steps of:

displaying, on one or more original image displays, one or more moving images used as an editing source by a hierarchical structure of a representative screen image of each of plural scenes;

duplicating one or more scenes from the one or more moving images as the editing source by selecting a representative screen image displayed by the one or more original image displays to generate a new moving image for editing;

displaying, on an editing display, the new moving image for editing duplicated in said duplicating step by the representative screen image of the one or more scenes; and managing the one or more moving images as the editing source and the new moving image for editing by the hierarchical structure, wherein the editing source includes a plurality of moving images, and wherein the duplicating in said duplicating step and the displaying in said displaying step are repeated using moving images extracted from the plurality of moving images to prepare a digest of the editing source.

5. An image editing method according to claim 4, further comprising editing the new moving image for editing by selecting a representative screen image of each scene displayed by the editing display.

6. An image editing method according to claim 4, wherein the representative screen image is a head image of each scene.

* * * * *

UNITED STATES PATENT AND TRADEMARK OFFICE
CERTIFICATE OF CORRECTION

PATENT NO. : 6,633,308 B1
DATED : October 14, 2003
INVENTOR(S) : Ono et al.

It is certified that error appears in the above-identified patent and that said Letters Patent is hereby corrected as shown below:

<u>Title page, Item [54] and Column 1, line 5,</u>
In the Title, "OF: FRAME" should read -- OF FRAME --.

<u>Drawings,</u>
Figure 11, "STRUCTUAL" should read -- STRUCTURAL --.

<u>Column 4,</u>
Line 61, "screen;" should read -- screen --.

<u>Column 6,</u>
Line 19, "as" should read -- among --.

<u>Column 7,</u>
Line 65, "an." should read -- an --.

<u>Column 8,</u>
Line 24, "to use" should read -- to the use --.

Signed and Sealed this

First Day of June, 2004

JON W. DUDAS
*Acting Director of the United States Patent and Trademark Office*